(12) United States Patent
Chilton et al.

(10) Patent No.: US 12,307,919 B1
(45) Date of Patent: May 20, 2025

(54) APPARATUS AND METHOD FOR DELIVERING ADAPTIVE EDUCATIONAL CONTENT

(71) Applicant: Cengage Learning, Inc., Boston, MA (US)

(72) Inventors: James Chilton, Hollis, NH (US); Charles Qian, Cincinnati, OH (US); Peter Griffiths, North Weymoth, MA (US); Jay Mehta, Newton, MA (US); Thais Alencar, Newton, MA (US)

(73) Assignee: Cengage Learning, Inc., Boston, MA (US)

( * ) Notice: Subject to any disclaimer, the term of this patent is extended or adjusted under 35 U.S.C. 154(b) by 0 days.

(21) Appl. No.: 18/496,268

(22) Filed: Oct. 27, 2023

(51) Int. Cl.
| | |
|---|---|
| *G09B 7/04* | (2006.01) |
| *G06Q 50/20* | (2012.01) |
| *G10L 15/02* | (2006.01) |
| *G10L 15/08* | (2006.01) |
| *G10L 15/22* | (2006.01) |
| *G10L 15/30* | (2013.01) |

(52) U.S. Cl.
CPC ........... *G09B 7/04* (2013.01); *G06Q 50/2053* (2013.01); *G10L 15/02* (2013.01); *G10L 15/08* (2013.01); *G10L 15/22* (2013.01); *G10L 15/30* (2013.01)

(58) Field of Classification Search
CPC ........................................................ G09B 7/04
See application file for complete search history.

*Primary Examiner* — Kesha Frisby
(74) *Attorney, Agent, or Firm* — Goodwin Procter LLP

(57) ABSTRACT

In a first aspect, an apparatus for delivering adaptive educational content using an automated tutoring model includes a processor and a memory communicatively connected to the processor is presented. The memory contains instructions configuring the processor to receive a prompt from a user. The processor, extract linguistic data from the prompt through an automated tutoring model. The processor is configured to determine, through the automated tutoring model, relevant educational data for the user based on the linguistic data of the prompt. The automated tutoring model is configured to classify the user to a learner group based on the prompt. The automated tutoring model is in communication with and selects the relevant educational data from an educational database based at least on the learner group. The processor is configured to present the selected relevant educational data to the user through a display device in communication with the processor.

20 Claims, 8 Drawing Sheets

APPARATUS AND METHOD FOR DELIVERING ADAPTIVE EDUCATIONAL CONTENT

TECHNICAL FIELD

The present disclosure generally relates to tutoring. In particular, the present disclosure relates to apparatuses, methods and supporting systems for automated tutoring using an automated tutoring model.

BACKGROUND

Traditional approaches to tutoring provide a one-size-fits-all approach to education that leave many individuals with specific educational needs unassisted. An artificial intelligence-enabled tutoring system and methods may improve modern tutoring approaches.

SUMMARY

In a first aspect, an apparatus for delivering adaptive educational content using an automated tutoring model includes a processor and a memory communicatively connected to the processor is presented. The memory contains instructions configuring the processor to receive a prompt from a user. The instructions, when further executed by the processor, extract linguistic data from the prompt through an automated tutoring model. The processor is configured to determine, through the automated tutoring model, relevant educational data for the user based on the linguistic data of the prompt. The automated tutoring model is configured to classify the user to a learner group based on the prompt. The automated tutoring model is in communication with and selects the relevant educational data from an educational database based at least on the learner group. The processor is configured to present the selected relevant educational data to the user through a display device in communication with the processor. The automated tutoring model is configured to receive a second prompt from the user based on the relevant educational data presented to the user and calculate, based on the prompt, second prompt, and educational data, a response for the second prompt and display the response for the second prompt to the user though the display device. The educational database includes textbooks, professor notes, video transcripts, or a combination thereof. The processor is configured to retrieve educational data from one or more external databases through an application programming interface (API). The processor is further configured to communicate the retrieved educational data to the automated tutoring model. The automated tutoring model is configured to determine the relevant educational data based at least in part on the retrieved educational data. The automated tutoring model is configured to classify a user's knowledge to a learner group based on the prompt. The automated tutoring model is further configured to determine relevant educational data for the user based at least in part on the learner group the user is classified to. The automated tutoring model is configured to determine an engagement of the user with the educational data and determine a response style based on the engagement of the user. The automated tutoring model is configured to determine a format of the educational data based on the engagement of the user and present educational data in the determined format to the user. The automated tutoring model is configured to track a progress of a user's learning through the prompt and determine educational data for the user based at least in part on the user's progress.

In another aspect, a method of delivering adaptive educational content using an automated tutoring model includes receiving a prompt from a user at an automated tutoring model is presented. The method includes extracting linguistic data of the prompt through the automated tutoring model and classifying, through the automated tutoring model, the user to a learner group based on the prompt. The method includes determining, through the automated tutoring model, relevant educational data for the user based on the linguistic data of the prompt and at least the learner group and selecting the relevant educational data from an educational database through the automated tutoring model. The method includes presenting the relevant educational data to the user through a display device. The method further includes receiving a second prompt at the automated tutoring model from the user based on the relevant educational data presented to the user, calculating, based on the prompt, second prompt, and educational data, a response for the second prompt through the automated tutoring model, and displaying the response for the second prompt to the user through the display device. The educational database includes textbooks, professor notes, video transcripts, or a combination thereof. The method includes retrieving educational data from one or more external databases through an application programming interface (API). The method includes communicating the retrieved educational data to the automated tutoring model. The automated tutoring model is configured to determine the relevant educational data based at least in part on the retrieved educational data. The method includes classifying a user's knowledge to a learner group based on the prompt. The method includes determining relevant educational data for the user based at least in part on the learner group the user is classified to. The method includes determining an engagement of the user with the educational data and determining a response style based on the engagement of the user. The method includes determining a format of the educational data based on the engagement of the user and presenting educational data in the determined format to the user. The method includes tracking a progress of a user's learning through the prompt and determining educational data for the user based at least in part on the user's progress.

BRIEF DESCRIPTION OF THE DRAWINGS

These and other features, aspects, and advantages of the present disclosure will become better understood with regard to the following description and accompanying drawings.

DETAILED DESCRIPTION

Students can have complex learning needs and traditional methods may often lack individualized instruction and may struggle to adapt to unique needs of students, such as various learning styles. At a high level, aspects of the present disclosure can be used to provide automated tutoring to users of various learning capabilities, preferences, educational backgrounds, and/or other factors. In various embodiments the techniques and supporting systems descried in the present disclosure generate a custom large language model that assists users in studying. Features of the invention can be used to simulate conversation between a user and an educator using an automated tutoring model. In some embodiments, one or more application programming interface (API) services can be integrated with an automated tutoring model, thus allowing the automated tutoring model to provide up-to-date, contextually-relevant and real time educational information.

Figure 1:
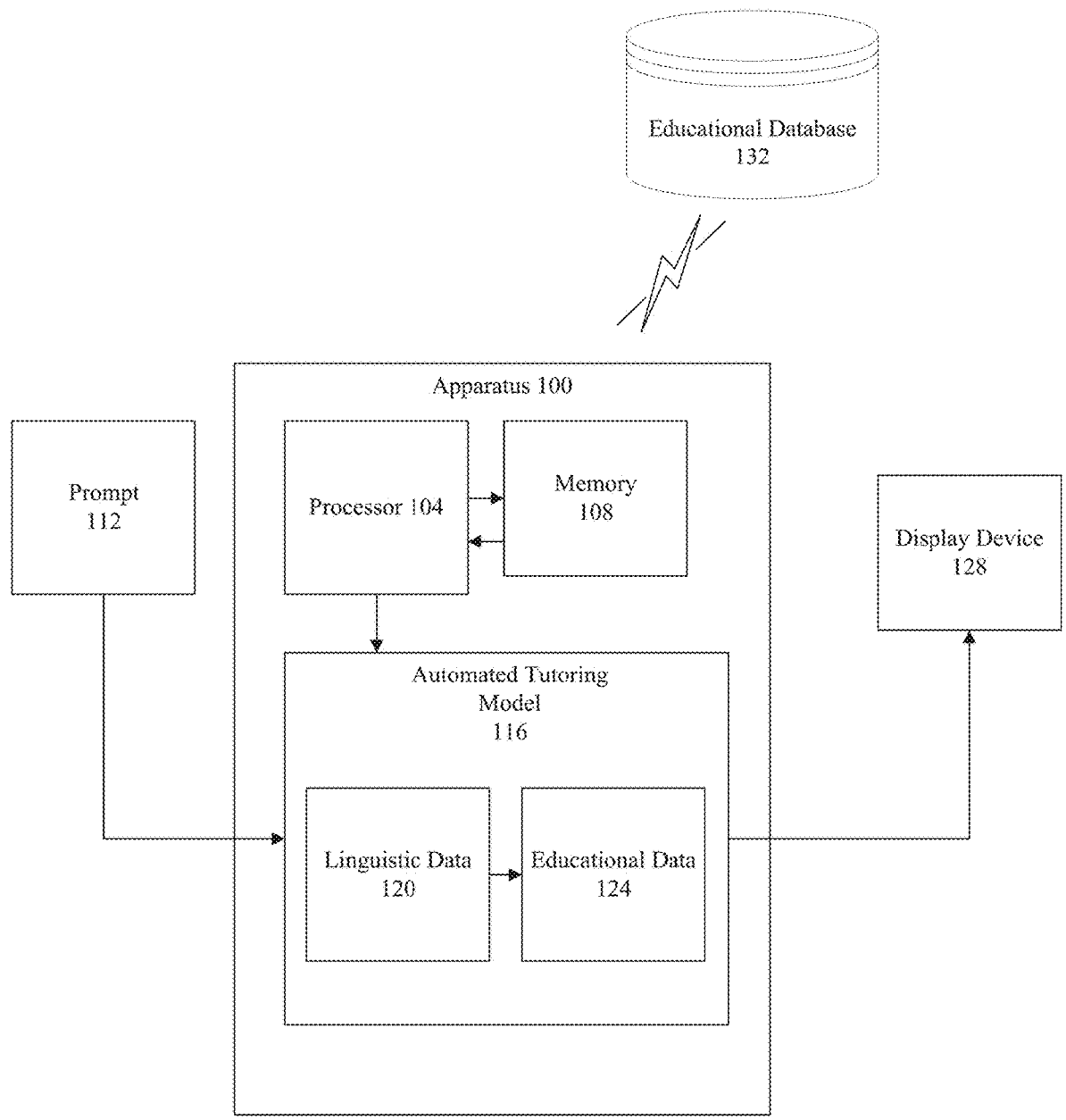
FIG. 1 illustrates a block diagram of an exemplary embodiment of an apparatus for automated tutoring.

Referring now to FIG. 1, an apparatus 100 for delivering adaptive educational content using an automated tutoring model is presented. Apparatus 100 may include processor 104 and memory 108. Processor 104 may be communicatively connected with memory 108. Memory 108 may contain instructions that when executed by the processor 104 perform various tasks. The processor 104 may enable both generic operating system (OS) functionality and/or application-specific operations. The apparatus 100 may include a memory 108, such as random access memory (RAM) and may further include instructions configuring the processor 104 to perform various tasks. In some embodiments, the processor 104 and the memory 108 may be communicatively connected. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. In some embodiments, the processor 104 may include any computing device as described in this disclosure, including without limitation a microcontroller, microprocessor, digital signal processor (DSP) and/or system on a chip (SoC) as described in this disclosure. The processor 104 may include, be included in, and/or communicate with a mobile device such as a mobile telephone or smartphone. The processor 104 may include a single computing device operating independently, or may include two or more computing device operating in concert, in parallel, sequentially or the like; two or more computing devices may be included together in a single computing device or in two or more computing devices. The processor 104 may interface or communicate with one or more additional devices as described below in further detail via a network interface device. Network interface device may be utilized for connecting the processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. The processor 104 may include but is not limited to, for example, a computing device or cluster of computing devices in a first location and a second computing device or cluster of computing devices in a second location. The processor 104 may include one or more computing devices dedicated to data storage, security, distribution of traffic for load balancing, and the like. The processor 104 may distribute one or more computing tasks as described below across a plurality of computing devices of computing device, which may operate in parallel, in series, redundantly, or in any other manner used for distribution of tasks or memory between computing devices. The processor 104 may be implemented using a "shared nothing" architecture in which data is cached at the worker, in an embodiment, this may enable scalability of apparatus 100 and/or computing the processor 104.

With continued reference to FIG. 1, processor 104 and/or a computing device may be designed and/or configured by memory 108 to perform any method, method step, or sequence of method steps in any embodiment described in this disclosure, in any order and with any degree of repetition. For instance, the processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. The processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 104 may be configured to generate or run one or more automated tutoring models 116. For instance, processor 104 may generate and/or train automated tutoring model 116 and in some instances communicate with automated tutoring model 116 through a network connection. In yet another embodiment, parameters of automated tutoring model 116 may be presented to processor 104 which may allow for an off-loading of heavy computational training of automated tutoring model 116 to one or more other computing devices. An "automated tutoring model" as used in this disclosure refers to a machine learning model that provides personalized and contextualized educational data to a user. Automated tutoring model 116 may include one or more natural language processing (NLP) models, large language models (LLM), and/or other language models. Automated tutoring model 116 may utilize a Markov chain and/or Hidden Markov Model (HMM), in some embodiments.

Automated tutoring model 116 be configured to extract and/or determine linguistic data 120 from one or more documents, user input, and/or other sources of data. "Linguistic data" as used in this disclosure is information relating to text. Linguistic data 120 may include one or more words, characters, symbols, numbers, strings of characters and/or words, questions, and the like. Linguistic data 120 may include punctuation, diacritic marks, engineering symbols, geometric dimensioning and tolerancing (G-D&T) symbols, chemical symbols and formulas, spaces, whitespace, and/or other symbols. Linguistic data 120 may be parsed into tokens, which may include a word, sequence of characters, and the like. The term "token," as used herein, refers to any smaller, individual groupings of text from a larger source of text. Tokens may be broken up by word, pair of words, sentence, or other delimitation. Tokens may in turn be parsed in various ways. Linguistic data 120 may be parsed into words or sequences of words, which may be considered words as well. Linguistic data 120 may be parsed into "n-grams", where all sequences of n consecutive characters may be considered. Any or all possible sequences of tokens or words may be stored as "chains", for example for use as a Markov chain or Hidden Markov Model, without limitation.

From these tokens, automated tutoring model 116 may generate one or more word vectors. A word vector is a vector space representing a word. A vector space, which may be a collection of vectors, may be a set of mathematical objects that can be added together under an operation of addition following properties of associativity, commutativity, existence of an identity element, and existence of an inverse element for each vector. Mathematical objects may be multiplied by scalar values under an operation of scalar multiplication compatible with field multiplication, and may have an identity element that may be distributive with respect to vector addition, and/or may be distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space. As a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element. Vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. A degree of similarity may include any other geometric measure of distance between vectors.

Automated tutoring model 116 may include one or more neural networks. A neural network may include a collection of interconnected nodes, where each node may represent a value. A neural network of automated tutoring model 116 may include one or more layers, such as, but not limited to, an input layer, a hidden layer, and/or an output layer. In some embodiments, automated tutoring model 116 may include one or more transformer layers. A transformer layer may be a neural network architecture that may follow an encoder-decoder structure without reliance on recurrent and/or convolutions to generate an output. One or more transformer layers of automated tutoring model 116 may be configured to inputs words and output associations of the words, such as type of words like nouns, adverbs, verbs, adjectives, and the like. In some embodiments, a first transformer layer may determine a type of word and a second transformer layer may determine an association with the word. For instance and without limitation, a first transformer layer may determine "bank" to be a noun and a second transformer layer may determine "bank" to relate to a financial institution and not a river bank. Automated tutoring model 116 may include a plurality of transformer layers. In some embodiments, automated tutoring model 116 may include a machine learning module such as described below with reference to FIG. 6, without limitation.

Automated tutoring model 116 may extract and/or determine linguistic data 120 from user prompt 112. A "prompt" as used in this disclosure is any query and/or instruction. For instance and without limitation, prompt 112 may include one or more queries for educational data 124. Queries may include searches for specific educational data 124, such as science facts, history facts, math facts, and/or other areas of studying. In other embodiments, prompt 112 may include instructions relating to educational data 124. Instructions may include, but are not limited to, requests for explanations regarding educational data 124, requests for images relating to educational data 124, requests for dates, authors, and the like of educational data 124, and/or other instructions. As a non-limiting example, prompt 112 may include an instruction for automated tutoring model 116 to show a user the chemical periodic table with the most reactive elements highlighted. As another non-limiting example, prompt 112 may include an instruction for automated tutoring model 116 to explain the difference between electric and magnetic fields. In some embodiments, prompt 112 may include an educational query, such as, but not limited to, inquiries about science, history, math, English, and the like. Prompt 112 may be received at apparatus 100 through user input of one or more devices, such as, but not limited to, keyboards, mouses, touchscreens, and the like. A user may enter prompt 112 in a graphical user interface (GUI) presented to the user, such as a GUI displayed through display device 128. In some embodiments, automated tutoring model 116 may prompt a user to enter a prompt 116, such as through images, text, audio, and the like. As a non-limiting example, automated tutoring model 116 may display, through display device 128, the phrase "What would you like to know?". Display device 128 may include, but are not limited to, laptops, smartphones, tablets, and/or other devices. Prompt 112 may include, without limitation, one or more words, characters, phrases, symbols, equations, and/or other textual data. As a non-limiting example, prompt 112 may include a question of "How do AC motors work?". Continuing this example, automated tutoring model 116 may extract "AC" "motors" "work" "AC motors" and/or other linguistic data 120 of prompt 112. Automated tutoring model 116 may be configured to compare similarities between words, characters, and/or symbols, such as through a language processing model. For instance and without limitation, prompt 112 may include "who discovered gravity?" to which automated tutoring model 116 may extract linguistic data 120 of "gravity" "discovered" and/or "who". Automated tutoring model 116 may correlate and/or generate a relationship between two or more words, such as "gravity" and "Newton". Automated tutoring model 116 may give one or more words, characters, and the like of linguistic data 120 one or more weights. Weights may be a value out of 1, 10, 100, and the like. For instance, and without limitation, prompt 112 may include "how do ionic bonds work?" to which automated tutoring model 116 may give a weight of 0.4 to "ionic", 0.3 to "bonds" and each of "how", "do", and "work" a value of 0.1 respectively for a total value of 1. Weights may be automatically adjusted and/or tuned by automated tutoring model 116. In other embodiments, a user may give certain weights to certain words for automated tutoring model 116 to utilize.

With continued reference to FIG. 1, automated tutoring model 116 may be configured to retrieve and/or generate educational data 124. For instance automated tutoring model 116 may generate educational data 124 from data stored in one or more databases in communication with automated tutoring model 116, such as, but not limited to, generation of one or more text responses. In some embodiments, automated tutoring model 116 may retrieve educational data 124 from one or more databases, such as educational data base 132, the Internet, proprietary document repositories and/or other sources of data. Automated tutoring model 116 may generate one or more web queries to retrieve educational data 124. Web queries may include searches for educational data 124 through the Internet, search engines, and/or other sources. Automated tutoring model 116 may generate one or more search indices. A search index may include a collection of data that may be parsed and/or stored to enable quicker information retrieval. In some embodiments, automated tutoring model 116 may generate one or more web crawler functions that may search through the Internet for various educational data 124. Automated tutoring model 116 may retrieve and/or generate educational data 124 based on prompt 112, linguistic data 120, and/or educational database 132. "Educational data" as used in this disclosure is information relating to an area of study. Educational data 124 may include, without limitation, language translations, laws and regulations, science facts, history facts, mathematical facts, and the like. Automated tutoring model 116 may determine relevant educational data 124 based on linguistic data 120 and/or prompt 112. Relevancy may be determined by a number of keywords found in educational data 124, such as through text of educational data 124 and/or text of metadata of educational data 124 such as in video transcripts, images, and the like. In some embodiments, relevancy may be determined by relationships generated between prompts 112 and educational data 124 by automated tutoring model 116. Relevancy may be determined by vector spaces, as described above and without limitation. In some embodiments, automated tutoring model 116 may be configured to generate and/or determine relational data between prompts 112 and educational data 124. Relational data may include subject matter information, sources of educational data 124, and the like. Automated tutoring model 116 may link various linguistic data 120 of prompts 112 to educational data 124 in a database, such as educational database 132 as described below with reference to FIG. 2, without limitation.

In some embodiments, automated tutoring model 116 may utilize metadata of educational data 124, which may include subject tags, authors, course identifiers, document version, dates, and the like. Subject tags may include one or more words relating to an image, such as "electron" "electron cloud" "valence electron" and the like of an image of an electron. For instance, a user may enter prompt 112 which may include a question of "what is quantum tunneling?" to which automated tutoring model 116 may determine relevant educational data 124 relating to quantum tunneling, such as a textbook passage, video transcript, whitepaper, and the like. Automated tutoring model 116 may provide educational data 124 in the form of a response to prompt 112. A response may be generated by automated tutoring model 116 based on educational data 124. For instance, automated tutoring model 116 may synthesize a text response based on educational data 124. As a non-limiting example, a user may enter prompt 112 of "what is the escape velocity of Earth?" to which automated tutoring model 116 may provide educational data 124 through display device 128 in the form of a text response such as "the escape velocity on Earth is about 11.2 km/s". Automated tutoring model 116 may provide educational data 124 in an audio form, such as through an artificial voice speaking through one or more speakers in communication with processor 104. In some embodiments, a plurality of artificial voices may be available for selection by a user. Artificial voices may include, without limitation, older American gentleman, younger American gentleman, older American woman, younger American woman, older British man, younger British man, older British woman, younger British woman, and the like. Artificial voices may be updated and/or received by processor 104 and/or automated tutoring model 116 for use through one or more communications with one or more databases. For instance, processor 104 and/or automated tutoring model 116 may download one or more artificial voices for use from one or more artificial voice databases. Automated tutoring model 116 may receive prompt 112 through user dictation, such as a user speaking into a microphone in communication with processor 104. Processor 104 may convert prompt 112 in an audio form into a word form for automated tutoring model 116. In other embodiments, automated tutoring model 116 may convert audio prompts 112 into word prompts 112. Processor 104 and/or automated tutoring model 116 may utilize a text-to-speech and/or speech-to-text algorithm. In some embodiments, processor 104 and/or automated tutoring model 116 may learn a user's speech patterns, dictation, and/or other characteristics of a user's voice. For instance, and without limitation, processor 104 and/or automated tutoring model 116 may prompt a user to repeat one or more phrases as an onboarding process to learn a user's voice patterns. Processor 104 and/or automated tutoring model 116 may be configured to learn a plurality of user's voice patterns, without limitation.

In some embodiments, educational data 124 may include one or more forms. For instance, educational data 124 may include forms such as, but not limited to, textbook passages, textbook notes, professor notes, whitepapers, journals, video transcripts, questions and answers, and the like. In some embodiments, automated tutoring model 116 may utilize a educational form classifier. An educational form classifier may be configured to classify educational data 124 to one or more forms, such as, but not limited to, journals, professor notes, whitepapers, video transcripts, and the like. An educational form classifier may be trained with training data correlating educational data 124 to one or more forms. Training data may be received through user input, external computing devices, and/or previous iterations of processing.

Automated tutoring model 116 may be configured to determine one or more forms of educational data 124 to present to a user. Automated tutoring model 116 may score various forms of educational data 124 based on various criteria. Scoring may include assigning a numerical value to one or more forms of educational data 124, such as a value out of 10, out of 100, out of five stars, a percentage value, a letter grade, and/or other numerical values. Criteria may include a relevancy to prompt 112, a recency of educational data 124, total size of educational data 124, and/or other criteria. For instance, and without limitation, automated tutoring model 116 may determine a set of professor notes may be the most applicable for a user based on prompt 112 and/or linguistic data 120 due to the professor notes having a most recent date and a highest number of matching keywords, giving the professor notes a score of 97% relative to a textbook passage having a score of 86%. Automated tutoring model 116 may provide educational data 124 through one or more images, audio samples, videos, text, and the like to a user through display device 128 and/or other devices. Processor 104 and/or automated tutoring model 116 may communicate with educational database 132. Educational database 132 may include a plurality of educational data 124 in a variety of forms, such as, but not limited to, textbook passages, textbook notes, professor notes, whitepapers, journals, video transcripts, question banks, answers and the like. Processor 104 and/or automated tutoring model 116 may utilize data from educational database 132 to determine educational data 124 for a user. For instance, a relevant textbook passage may reside in educational database 132, which automated tutoring model 116 may retrieve and present to a user.

Automated tutoring model 116 and/or processor 104 may communicate with one or more other databases, proprietary content repositories, the Internet, and the like through one or more application programming interfaces (APIs). Automated tutoring model 116 and/or processor 104 may communicate with databases in real-time which may allow for up-to-date and/or real-time educational data 124 for a user. In some embodiments, automated tutoring model 116 and/or processor 104 may communicate with one or more electronic libraries, such as, but not limited to, math libraries, science libraries, history libraries, legal libraries, and the like. Automated tutoring model 116 may compare data of one or more libraires to determine a most up-to-date version. Comparisons may include comparison of dates, authors, languages, sources and the like. In some embodiments, automated tutoring model 116 may select educational data 124 in response to prompt 112 based on a proprietary nature of the educational data 124. For instance, educational data 124 may be proprietary, as described below with reference to FIG. 2. Automated tutoring model 116 may receive one or more user authentications, such as, but not limited to, e-mail addresses, usernames, passwords, and the like which may correspond to specific publishers and/or authors of the educational data 124. Automated tutoring model 116 may select educational data 124 based on licensed rights a user may have to the educational data 124, which may be determined by one or more user credentials. User credentials may be received separately or in combination with prompt 112. Automated tutoring model 116 may utilize real-time data to provide answers to deterministic prompts 112, for example and without limitation the newest quantum mathematics equations. Automated tutoring model 116 may be configured to operate in multiple languages, such as, but not limited to, English, Spanish, Russian, Portuguese, French, Italian, Japanese, and the like. A user may select a language for automated tutoring model 116 to operate in. In some embodiments, automated tutoring model 116 may change languages based on a language of prompt 112. As a non-limiting example, prompt 112 may initially be in English, to which automated tutoring model 116 may provide an answer for in English. A second prompt may be in Japanese, which automated tutoring model 116 may respond to in Japanese and may continue in Japanese unless otherwise instructed by a user or if prompt 112 changes languages again. Automated tutoring model 116 may be in communication with one or more language databases which may enable automated tutoring model 116 to understand multiple languages and accommodate users from all types of backgrounds and ethnicities.

Still referring to FIG. 1, automated tutoring model 116 may act as and/or employ one or more chatbots. A "chatbot" as used in this disclosure is a computer program designed to simulate human conversation. Automated tutoring model 116 may use artificial intelligence (AI) chatbots, generative AI chatbots, voice chatbots, rules-based chatbots, and/or button-based chatbots. Automated tutoring model 116 may be configured to determine a context of prompt 112. For instance, and without limitation, automated tutoring model 116 may determine prompt 112 relates to a previously entered prompt 112. As a non-limiting example, prompt 112 may include a question of "what makes a cloud?" to which automated tutoring model 116 may provide an answer with educational data 124 relating to a captioned image of a cloud. A second prompt 112 may include "what other types of clouds are there?" to which automated tutoring model 116 may determine a context of clouds different from the image of the cloud previously presented and may present educational data 124 relating to thunderclouds different from the previously presented thundercloud. Automated tutoring model 116 may determine context between prompts 112, educational data 124, linguistic data 120, and/or other data. For instance, automated tutoring model 116 may determine context within educational data 124, such as but not limited to related mathematical equations, related natural phenomena, related historical facts, and/or other relations. Automated tutoring model 116 may determine context between two or more prompts 112. For instance, and without limitation, automated tutoring model 116 may determine a context of prompt 112 with relation to another prompt 112, such as a second prompt 112 in a form of a follow up question from a first prompt 112. As a non-limiting example, a first prompt 112 may include a question of "when did the battle of Gettysburg take place?" to which automated tutoring model 116 may provide an answer with educational data 124 relating to the battle of Gettysburg, such as text of "1863". A user may enter a second prompt 112 in a form of a follow up question of "how long did the battle last?" to which automated tutoring model 116 may determine a context relative to the first prompt 112 and respond with educational data 124 in a form of text stating "from July 1st to Jul. 3, 1863". Automated tutoring model 116 may utilize any language model and/or machine learning model as described throughout this disclosure, without limitation, to generate a chatbot.

Figure 2:
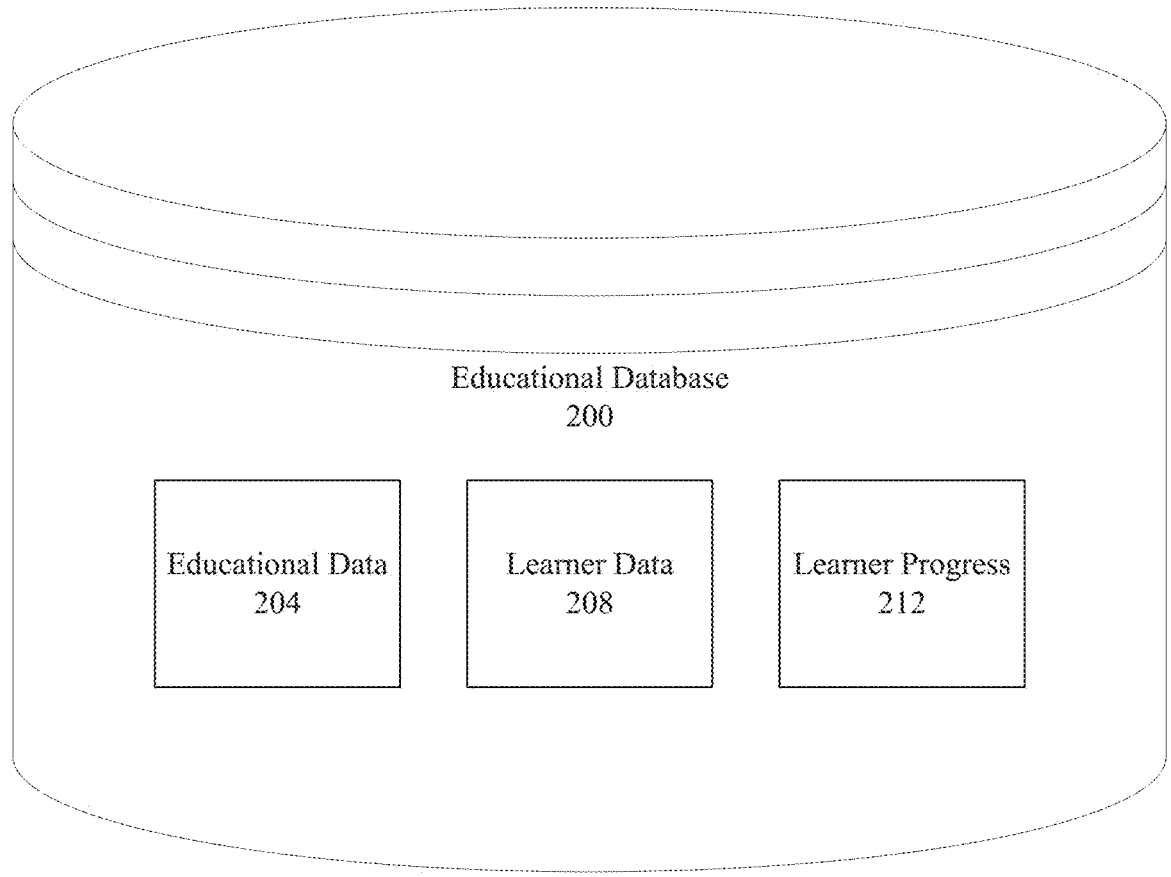
FIG. 2 illustrates an exemplary embodiment of an educational database.

Referring to FIG. 2, the methods and systems described herein may include an educational database 200, which may be the same or similar to educational database 132 as described above with reference to FIG. 1. Educational database 200 may be a relational or other database. Educational database 200 may be an XML, SQL, XQuery, or other database. In some embodiments, educational database 200 may have a plurality of rows and columns, tables, and the like. Educational database 200 may include educational data 204. Educational data 204 may be the same as educational data 124 as described above with reference to FIG. 1. In some embodiments, educational data 204 may include a plurality of data relating to science, history, English, mathematics, and/or other types of data. Educational data 204 may be categorized into one or more categories, such as, but not limited to, mathematics, physics, chemistry, World War II, English, law, business, and/or other categories, without limitation. A classifier may be used to categorize educational data 204 into one or more categories. For instance, a classifier may be configured to classify educational data 204 to one or more categories, such as, but not limited to, math, science, history, English, and/or other categories. A classifier may be trained with training data correlating educational data 204 to one or more categories. Training data may be received through user input, external computing devices, and/or previous iterations of processing. In some embodiments, automated tutoring model 116, as described above with reference to FIG. 1, may classify educational data 204 to one or more categories. Educational data 204 may be categorized and/or otherwise classified to one or more forms of data, such as journals, whitepapers, video transcripts, professor notes, and/or other forms of data, such as described above with reference to FIG. 1.

Educational database 200 may include learner data 208. Learner data 208 may include information of one or more users. For instance, learner data 208 may include areas of study, engagement levels, age, geography, native language, preferred educational styles, and the like of one or more users. Engagement levels and educational styles may be as described below with reference to FIG. 3. In some embodiments, educational database 200 may include learner progress 212. Learner progress 212 may include a relative increase in proficiency in one or more areas of study of a particular user and/or a plurality of users. For instance, learner progress 212 may include a 5% increase in Spanish fluency relative to a week ago of a particular user. Learner progress 212 may be as described below with reference to FIG. 3. Automated tutoring model 116 may update any data within educational database 200. In some embodiments, automated tutoring model 116 may communicate with one or more data sources to update educational database 200, such as the internet, university websites and the like. Automated tutoring model 116 may communicate with one or more API's, as described above with reference to FIG. 1 to update educational database 200.

With continued reference to FIG. 2, educational database 200 may be proprietary (e.g., subject to copyright and/or licensing restrictions imposed by the author or owner of the materials in the educational database 200. In some cases, the educational database 200 may comprise proprietary materials from more than one owner/licensor/author, and the use of the educational data 204 may be limited to only the data for which the user has been granted or acquired the necessary rights. In some embodiments, educational database 200 may store or otherwise categorize educational data 204 by owners, licensors, authors, and the like, without limitation. For instance, a first collection of educational data 204 may be available under a specific license to Suffolk University while a second collection of educational data 204 may be available under a specific license to Northeastern University. Proprietary educational data 204 may include materials from, but not limited to, professors, companies, corporations, tutors, and/or other entities. For instance, educational data 204 may be selected and/or provided by an entity such as, but not limited to, a tutor, teacher, school, college, university, and the like. Educational data 204 may be generated by one or more individuals, such as, but not limited to, tutors, teachers, professors, teaching assistants, and/or other individuals. Educational data 204 may be generated for specific classes, courses, and/or other academic purposes. As a non-limiting example, educational data 204 may include a proprietary lecture on electromechanics generated by a professor at the Massachusetts Institute of Technology (MIT). As another non-limiting example, educational data 204 may include Calculus III questions and answers generated by a college-level math tutor. Educational data 204 may be added to from one or more individuals through networks, servers, or other wireless devices. For instance, an English teacher may add English lessons to educational data 204 over a web portal.

In some embodiments, educational data 204 may include data retrieved through one or more databases, online resources, and the like. For instance, as described above with reference to FIG. 1, automated tutoring model 116 may search through the Internet for educational data. Automated tutoring model 116 and/or other processes and/or individuals may add educational data 204 to educational database 200 based on educational criteria. Educational criteria may include one or more standards for acceptance of educational data 204 into educational database 200. Standards may include, but are not limited to, age of data, size of data, author of data, source of data, and the like. For instance, automated tutoring model 116 and/or a computing device may compare publication dates of educational data 204 to ensure the most up-to-date educational data 204 is used. Educational database 200 may use a proprietary system to obtain and/or store educational data 204. A proprietary system may include obtaining educational data 204 from one or more entities, retrieving educational data 204 from selected online sources, and/or other methods as described above, without limitation.

Continuing to refer to FIG. 2, in some embodiments, educational database 200 may include a combination of proprietary and non-proprietary educational data 204. For instance, and without limitation, educational data 204 may include coding language data from a public online source and data from a specific coding tutor. In some embodiments, there may be a ratio of proprietary data to non-proprietary data. A ratio may be selected based on subject matter, educational levels such as middle school, high school, undergrad, graduate, and/or other factors. Ratios may include anywhere between about 1:1, 100:1, 1:100, and/or other ranges. As a non-limiting example, educational data 204 may include a ratio for high school history of about 4:1 of non-proprietary to proprietary educational data 204.

Figure 3:
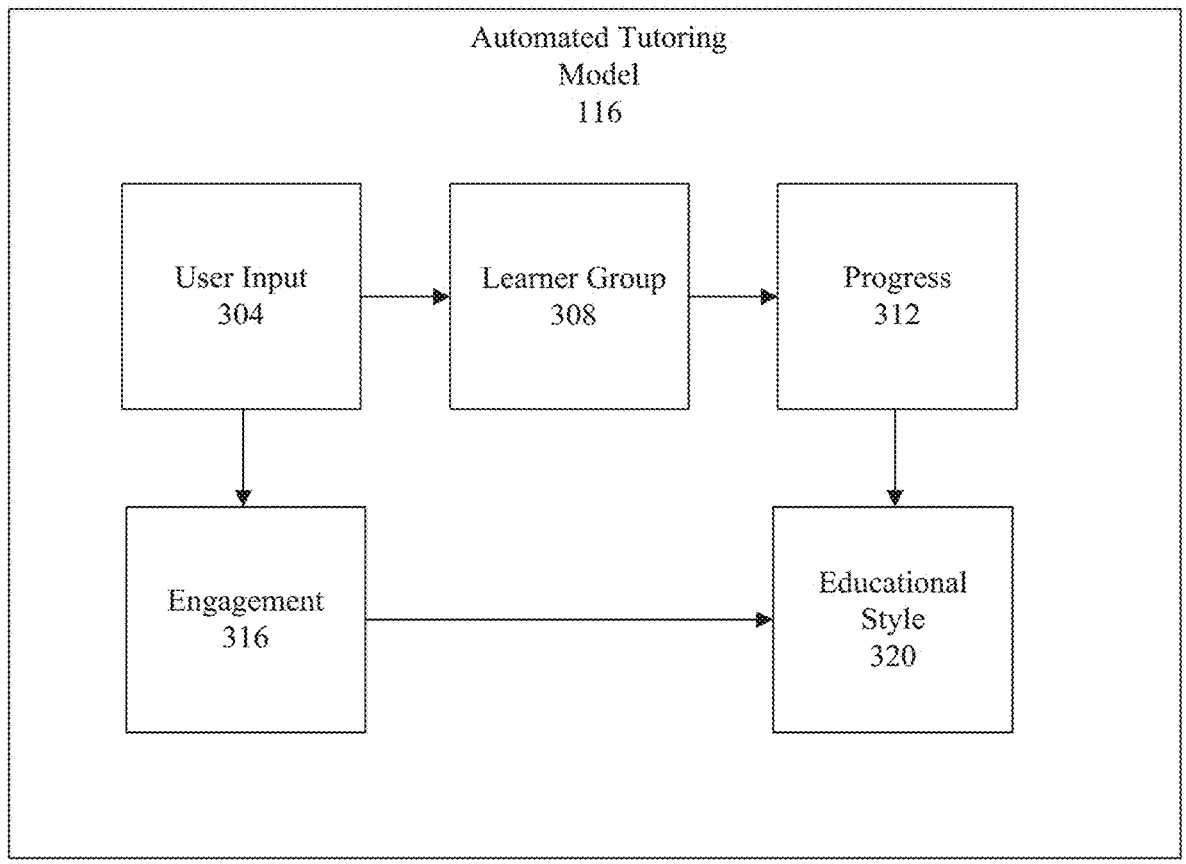
FIG. 3 illustrates an exemplary embodiment of an automated learning process using an automated tutoring model.

Referring to FIG. 3, an exemplary embodiment of an automated learning process automated tutoring model 300 may include automated tutoring model 116, such as described above with reference to FIG. 1. Automated tutoring model 116 may be configured to receive user input 304. User input 304 may include one or more prompts 112, such as described above with reference to FIG. 1. In some embodiments, user input 304 may include one or more characters, words, phrases, symbols, and the like. In some embodiments, user input 304 may be in response to educational data presented to the user. Automated tutoring model 116 may present educational data to a user in a form of a question. Questions may include, without limitation, questions about history, science, math, English, Spanish, and the like. For instance, and without limitation, automated tutoring model 116 may ask a mathematical question involving differential equations. A user may provide user input 304 in response to a question provided by automated tutoring model 116. Automated tutoring model 116 may compare user input 304 to one or more databases to determine if the user input 304 is a correct answer to a previously asked question. In some embodiments, automated tutoring model 116 may provide a user with a score. For instance, and without limitation, automated tutoring model 116 may grade a mathematical answer of user input 304 as "correct". In some embodiments, automated tutoring model 116 may give a relative score to user input 304. For instance, and without limitation, automated tutoring model 116 may ask a question about a historical fact. User input 304 may include a partially correct answer, such as a correct historical figure and event but a wrong date. Automated tutoring model 116 may give a score of 80% to a partially correct answer. Automated tutoring model 116 may compare user input 304 to databases, previous user input 304, and the like to determine learner group 308. A "learner group" as used in this disclosure is a classification of an expertise and/or style of learning of a user. For instance, and without limitation, learner group 308 may include beginner, intermediate, advance, expert, master, and the like. Automated tutoring model 116 may utilize a learner group classifier to classify one or more users to one or more learner groups 308. A learner group classifier may be trained with training data correlating user input and/or educational data to one or more learner groups 308. Training data may be received through user input, external computing devices, and/or previous iterations of processing. Automated tutoring model 116 may utilize a learner group classifier to classify one or more users to learner groups 308, such as, but not limited to, beginner, intermediate, advanced, expert, master, and the like. Classification may be relative to a cohort of users, such as an average knowledge level of a plurality of users. An average knowledge level of a plurality of users may be calculated based on a plurality of user input 304 from a plurality of users.

Automated tutoring model 116 may calculate progress 312 of a user. Progress 312 may include a relative increase in knowledgeability. Progress 312 may be measured over a period of time such as, but not limited to, minutes, hours, weeks, months, years, and the like. In some embodiments, progress 312 may be specific to a subject area. For instance, and without limitation, automated tutoring model 116 may calculate progress 312 of a user's abilities in stoichiometry. Automated tutoring model 116 may calculate a percent increase of a level of progress 312, such as out of 10, out of 100, and the like. As a non-limiting example, progress 312 may include a 5% increase in knowledge of World War II of a user.

In some embodiments, automated tutoring model 116 may be configured to determine engagement 316. Engagement 316 is a measure of interaction between a user and forms of educational data presented to a user. Engagement 316 may be calculated based on an amount of time a user spends viewing or otherwise interacting with a form of educational data, such as, but not limited to, readings, images, videos, audio samples, and the like. Engagement 316 may be relative to a specific subject. For instance, engagement 316 may show that a user spends a majority of time with educational data about circuit diagrams and a minority of time with Shakespearean works. Engagement 316 may be calculated by a time spent by a user interacting with a passage, image, video, and the like. For example, and without limitation, engagement 316 may be calculated by the time a user spends viewing an image of a human T-cell. Automated tutoring model 116 may track a user's activity, such as keyboard clicks, mouse movement, and the like, without limitation. Automated tutoring model 116 may track a stationary mouse cursor and may track an amount of time in between mouse movement which may indicate a user is spending time viewing what's on a screen. Automated tutoring model 116 may track a time in between prompts received, which may be indicative of an engagement level. A time in between prompts received may include anywhere of about 0.5 seconds to about 10 minutes. In some embodiments, a time in between prompts received may be less than about 0.5 seconds or greater than about 10 minutes. In some embodiments, a time in between prompts received may be indicative of progress 312, such as if the prompts received are answers to questions generated by automated tutoring model 116. As a non-limiting example, automated tutoring model 116 may provide three questions relating to meteorology. A user may answer all three questions correctly within 10 minutes, which may show the user has a higher understanding of meteorology. In some embodiments, automated tutoring model 116 may utilize an engagement classifier. An engagement classifier may be trained with training data correlating user input 304 and/or educational data to one or more levels of engagement 316. Training data may be received through user input, external computing devices, and/or previous iterations of processing. An engagement classifier may be configured to input user input 304 and output one or more engagement levels 316. Engagement levels 316 may include, but are not limited to, low engagement, medium engagement, high engagement, and the like. Threshold for engagement metrics, such as time in between mouse movements, may be tuned by automated tutoring model 116 and/or may be received through user input. For instance, a stationary mouse of user input 304 for greater than 15 seconds may start a count of mouse inactivity which may indicate a user is focusing on what's being displayed on a screen.

Still referring to FIG. 3, automated tutoring model 116 may be configured to determine educational style 320. An "educational style" as used in this disclosure is a preferred form of education of a user. Preferred forms of education may include forms of educational data, such as, but not limited to, text, images, video, audio samples, and the like. Educational style 320 may include, but is not limited to, visual learning, audio learning, reading/writing learning, social/linguistic learning, logical/analytical learning, and the like. Automated tutoring model 116 may determine educational styles 320 for specific subjects. For instance, a user may be a visual learner for physics but may be an auditory learner for history. Automated tutoring model 116 may determine educational style 320 based on user input 304, learner group 308, progress 312, and/or engagement 316. For instance, and without limitation, if a user has low progress 312 and a low learner group 308 for a particular subject, automated tutoring model 116 may determine educational style 320 for that particular subject may not be effective. Automated tutoring model 116 may dynamically change educational styles 320 based on user input 304, learner group 308, progress 312, and/or engagement 316. In some embodiments, a user may provide one or more preferences of educational styles 320 to automated tutoring model 116. In other embodiments, automated tutoring model 116 may automatically determine a best educational style 320 for a user.

In some embodiments, one or more users may be classified to learner group 308 based on, but not limited to, engagement 316, educational style 320, progress 312, and/or other factors. For instance and without limitation, users with high engagement 316 of educational content may be classified to a learner group 308 of a high-focus group. Users that show an educational style 320 for image-based content may be classified to a visual learner group 308. Likewise, users that show an educational style 320 for audio-based content may be classified to an auditory learner group 308. In some embodiments, progress 312 may be used to classify one or more users to learner group 308. For instance, some users may have a harder time retaining and/or understanding educational data than others and may have slower progress 312 than that of other users. Automated tutoring model 116 and/or learner group classifier may classify one or more users into slow learner, average learner, fast learner, or other learner groups 308. One or more users may continually be classified to various learner groups 308 based on user input 304. For instance, an initially slow learner classified to a slow learner group 308 may show quick advancement in a subject and may be classified to a fast learner group 308 later on. A learner group classifier and/or automated tutoring model 116 may compare one or more averages, standard deviations, and the like of user input 304 to determine which learner group 308 a user should be placed in. In some embodiments, automated tutoring model 116 may classify a user to learner group 308 through one or more prompts, such as prompt 112 as described above with reference to FIG. 1. For instance automated tutoring model 116 may determine a prompt of a user to include specific subject matter, a question showing a high understanding of specific subject matter, a preference for an education style, and/or other factors.

Automated tutoring model 116 may classify a user to a learner group 308 based on one or more iterations of received prompts. As a non-limiting example, automated tutoring model 116 may receive a prompt with the phrase "How do I account for the Hall effect when solving the circuit shown in FIG. 3?". Automated tutoring model 116 may determine the phrase to include a college level understanding of electrical circuits as well as a preference for image-based educational data. Automated tutoring model 116 may classify the user to learner group 308 of a visual-based learner with an intermediate knowledge of circuits. Automated tutoring model 116 may receive a plurality of prompts from a plurality of users and iteratively classify users based on the prompts. In some embodiments, automated tutoring model 116 may initially start with criteria for classification of users to learner groups 308. Criteria may be received through user input, external computing devices, or other methods. For instance and without limitation, automated tutoring model 116 may initially start with criteria that if a prompt includes a question about pointers in the Python programming language than the user should be classified to a visual-based learner group with an intermediate knowledge of coding. Criteria may include, without limitation, subject matter, complexity of prompt, length of prompt, and the like.

Automated tutoring model 116 may utilize one or more learner groups 308 to provide educational data, such as educational data 124 as described above with reference to FIG. 1. For instance, and without limitation, automated tutoring model 116 may select image-based educational data, audio-based educational data, complex educational data, simple educational data, and/or other forms of educational data. Automated tutoring model may select relevant educational data based on learner groups 308 such as, but not limited to, slow learner groups 308, average learner groups 308, fast learner groups 308, high-engagement learner groups 308, low-engagement learner groups 308, and/or other factors. For instance and without limitation, a user may be classified to a learner group 308 of a middle school mathematics understanding, to which automated tutoring model 116 may retrieve kid-friendly mathematic educational data that may be more simplistic in nature with images, diagrams, and the like. In some embodiments, a user may be classified to two or more learner groups 308. For instance, and without limitation, a user may be classified to a learner group 308 of visual-learning and a learner group 308 of a high-level understanding of kinematics. As a non-limiting example, automated tutoring model 116 may select relevant educational data of a video-based Spanish lesson that is completely in Spanish and is 45 minutes long based on a user being classified to a learner group 308 of advanced Spanish and/or an auditory learner group 308. Automated tutoring model 116 may assign one or more weights to one or more learner groups 308 while selecting relevant educational data. Weights may include a number out of 1, 10, 100, a percentage value, and the like. For instance, in the above example, the advanced Spanish learner group 308 may have a weight of 0.6 while the auditory learner group 308 may have a weight of 0.4. Higher weighted learner groups 308 may influence selected relevant educational data greater than lower weighted learner groups 308. Weights may be received through user input and/or may be calculated through iterations of processing. Learner groups 308 may be combined to form sub-learner groups. For instance, and without limitation, a first learner group 308 may include a fast-learner group and a second learner group 308 may include a high-engagement learner group. Automated tutoring model 116 may combine the first and second learner groups to form a sub-learner group of rapid learning group. Any learner groups 308 described throughout this disclosure may be combined to form one or more sub-learner groups.

Figure 4:
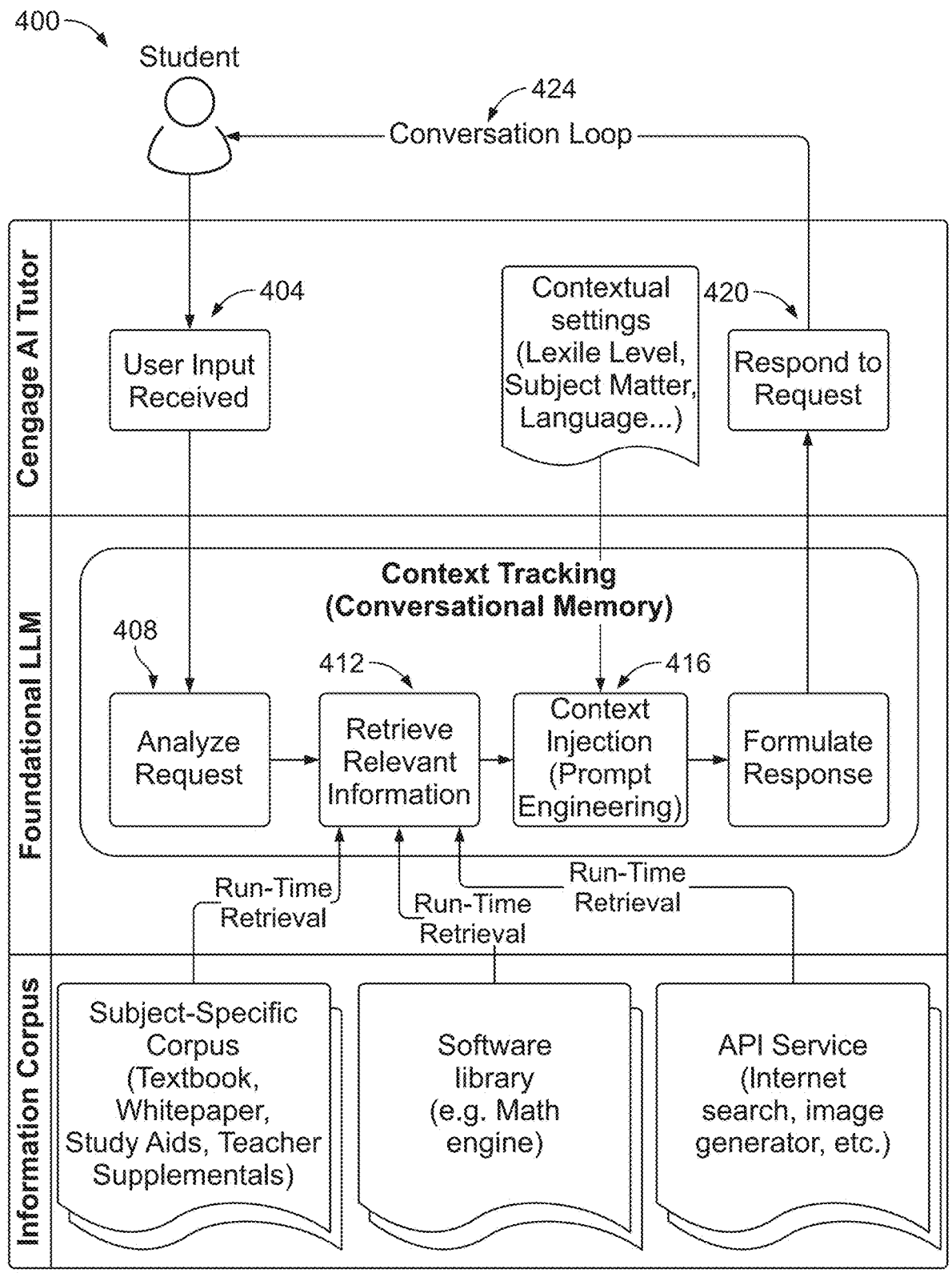
FIG. 4 illustrates an exemplary embodiment of a process of automated tutoring using an automated tutoring model.

Referring now to FIG. 4, a process of automated tutoring 400 automated tutoring model includes receiving user input. User input may be received by an individual at a computing device, such as a laptop, smartphone, tablet, desktop, and the like. User input may include one or more prompts, such as inquiries and/or instructions as described above with reference to FIG. 1. User input may be received through an artificial intelligence assistant, such as automated tutoring model 116 as described above with reference to FIG. 1. User input may include text, voice commands, and/or other forms of input. User input may be received through a keyboard, mouse, touchscreen, and the like.

At step 408, context tracking is performed. Context tracking may include analyzing a request of user input from step 404 such as parsing, identifying, categorizing, or otherwise processing user input. Analyzing a request may include identifying one or more keywords or other linguistic data of user input.

At step 412, context tracking may include retrieving relevant information from one or more databases. For instance, relevant information may be retrieved from subject-specific corpuses, such as, but not limited to, textbooks, whitepapers, study aids, teacher supplements, and the like. Alternatively and/or in combination, relevant information may be retrieved through one or more software libraries, such as a math engine. Additionally or alternatively, retrieval of information may include utilizing an API service such as an internet search, image generator, and the like. Retrieval of information may include retrieving information from a subject-specific corpus, software library, and/or API service, without limitation.

At step 416, prompt engineering/context injection includes injecting contextual information such as lexile levels, subject matter, languages, educational preferences, and the like relating to a user into the user input. Contextual information may include a context of user input received at step 404, such as with relation to previous prompts of user input received at step 404.

At step 420, a response is formulated based on the previous steps. A response may be in the form of text, image, video, audio, and/or other forms. In some embodiments, a response may include artificially generated text that may correspond to one or more images, videos, textbook passages, and the like that may have been retrieved at step 412. A response may be formulated in context with user input received at step 404. For instance and without limitation, a user may provide user input at step 404 of "which page of the textbook is this passage from?" to which a formulated response may include "page 384" along with the passage recited at page 384 of the textbook.

At step 420, a response to a request received at step 404 is provided. As noted above in step 420, a response to a request may be provided in text, image, video, audio, and/or other format.

At step 424, a conversational loop is generated. A conversational loop may include a one or more cycles of responses and requests. A conversational loop may keep track of context of a conversation between a user and an AI assistant such as automated tutoring model 116, via a chatbot, for example. Context may include subject matter, previously asked questions, instructions provided by a user, learner groups of a user, languages of a user, and the like. Process 400 and each of its steps may be implemented without limitations as described above with reference to FIGS. 1-3.

Figure 5:
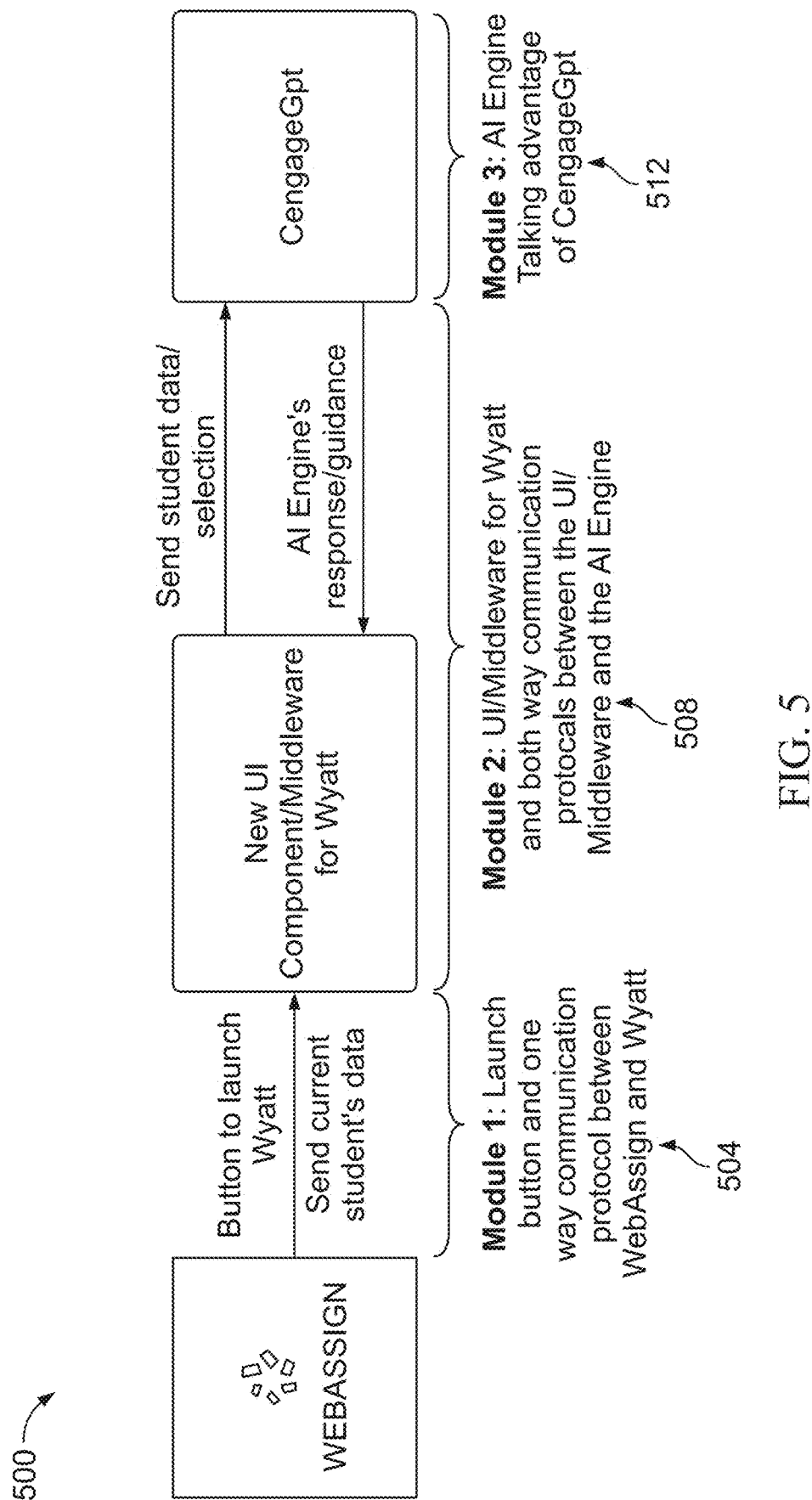
FIG. 5 illustrates an exemplary embodiment of a framework of accessing an automated tutoring model.

FIG. 5 illustrates a framework 500 for accessing an automated tutoring model. At step 504, one or more launch buttons may be engaged through a user interface. A launch button may engage a one way communication protocol between an artificial assistant and a web portal.

At step 508, middleware for an AI assistant and a web portal is employed to facilitate two way communication protocols between a user interface and an AI engine.

At step 512, an AI engine is engaged. An AI engine may include a large language model, such as automated tutoring model 116. User data, user selections, and the like may be communicated to an AI engine and the AI engine may provide response/guidance to a user interface for a user. Process 500 and each of its steps may be implemented, without limitation, as described above with reference to FIGS. 1-4.

Figure 6:
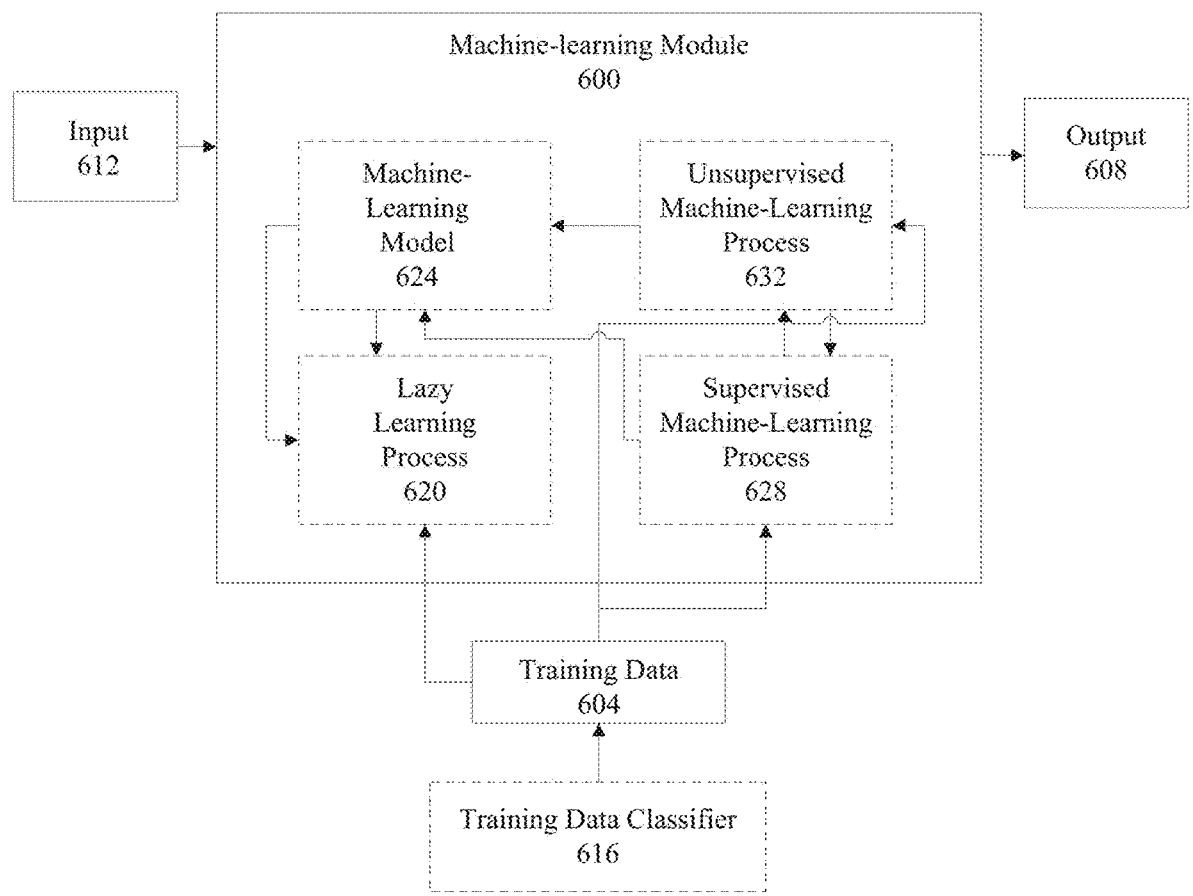
FIG. 6 illustrates an exemplary embodiment of a machine learning model.

FIG. 6 illustrates an exemplary embodiment of a machine-learning module 600 that may perform one or more machine-learning processes as described herein. Machine-learning module 600 may be configured to perform various determinations, calculations, processes and the like as described in this disclosure using a machine-learning process. A "machine learning process," as used in this disclosure, is a process that automatedly uses training data to generate an algorithm that calculates outputs given data as inputs. A machine learning process contrasts to a non-machine learning software program where the commands to be executed are determined in advance by a user and written in a programming language.

Still referring to FIG. 6, machine learning module 600 may utilize training data 604. "Training data," as used herein, refers to data containing correlations that a machine-learning process may use to model relationships between two or more categories of data elements. For instance, and without limitation, training data 604 may include a plurality of data entries, each entry representing a set of data elements that were recorded, received, and/or generated together. Training data 604 may include data elements that may be correlated by shared existence in a given data entry, by proximity in a given data entry, or the like. Multiple data entries in training data 604 may demonstrate one or more trends in correlations between categories of data elements. For instance, and without limitation, a higher value of a first data element belonging to a first category of data element may tend to correlate to a higher value of a second data element belonging to a second category of data element, indicating a possible proportional or other mathematical relationship linking values belonging to the two categories.

Multiple categories of data elements may be related in training data 604 according to various correlations. Correlations may indicate causative and/or predictive links between categories of data elements, which may be modeled as relationships such as mathematical relationships by machine-learning processes as described in further detail below. Training data 604 may be formatted and/or organized by categories of data elements. Training data 604 may, for instance, be organized by associating data elements with one or more descriptors corresponding to categories of data elements. As a non-limiting example, training data 604 may include data entered in standardized forms by one or more individuals, such that entry of a given data element in a given field in a form may be mapped to one or more descriptors of categories. Elements in training data 604 may be linked to descriptors of categories by tags, tokens, or other data elements. Training data 604 may be provided in fixed-length formats, formats linking positions of data to categories such as comma-separated value (CSV) formats and/or self-describing formats. Self-describing formats may include, without limitation, extensible markup language (XML), JavaScript Object Notation (JSON), or the like, which may enable processes or devices to detect categories of data.

With continued reference to refer to FIG. 6, training data 604 may include one or more elements that are not categorized. Uncategorized data of training data 604 may include data that may not be formatted or containing descriptors for some elements of data. In some embodiments, machine-learning algorithms and/or other processes may sort training data 604 according to one or more categorizations. Machine-learning algorithms may sort training data 604 using, for instance, natural language processing algorithms, tokenization, detection of correlated values in raw data and the like. In some embodiments, categories of training data 604 may be generated using correlation and/or other processing algorithms. As a non-limiting example, in a body of text, phrases making up a number "n" of compound words, such as nouns modified by other nouns, may be identified according to a statistically significant prevalence of n-grams containing such words in a particular order. For instance, an n-gram may be categorized as an element of language such as a "word" to be tracked similarly to single words, which may generate a new category as a result of statistical analysis. In a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure, without limitation.

Further referring to FIG. 6, training data 604 may be filtered, sorted, and/or selected using one or more supervised and/or unsupervised machine-learning processes and/or models as described in further detail below. In some embodiments, training data 604 may be classified using training data classifier 616. Training data classifier 616 may include a classifier. A "classifier" as used in this disclosure is a machine-learning model that sorts inputs into one or more categories. Training data classifier 616 may utilize a mathematical model, neural net, or program generated by a machine learning algorithm. A machine learning algorithm of training data classifier 616 may include a classification algorithm. A "classification algorithm" as used in this disclosure is one or more computer processes that generate a classifier from training data. A classification algorithm may sort inputs into categories and/or bins of data. A classification algorithm may output categories of data and/or labels associated with the data. A classifier may be configured to output a datum that labels or otherwise identifies a set of data that may be clustered together. Machine-learning module 600 may generate a classifier, such as training data classifier 616 using a classification algorithm. Classification may be performed using, without limitation, linear classifiers such as without limitation logistic regression and/or naive Bayes classifiers, nearest neighbor classifiers such ask-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to educational data.

Still referring to FIG. 6, machine-learning module 600 may be configured to perform a lazy-learning process 620. Lazy-learning process 620 may include a "lazy loading" or "call-when-needed" process and/or protocol. A "lazy-learning process" may include a process in which machine learning is performed upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Still referring to FIG. 6, machine-learning processes as described in this disclosure may be used to generate machine-learning models 624. A "machine-learning model" as used in this disclosure is a mathematical and/or algorithmic representation of a relationship between inputs and outputs, as generated using any machine-learning process including without limitation any process as described above, and stored in memory. For instance, an input may be sent to machine-learning model 624, which once created, may generate an output as a function of a relationship that was derived. For instance, and without limitation, a linear regression model, generated using a linear regression algorithm, may compute a linear combination of input data using coefficients derived during machine-learning processes to calculate an output. As a further non-limiting example, machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include supervised machine-learning process 628. A "supervised machine learning process" as used in this disclosure is one or more algorithms that receive labelled input data and generate outputs according to the labelled input data. For instance, supervised machine learning process 628 may include prompts as described above as input, educational data as outputs, and a scoring function representing a desired form of relationship to be detected between inputs and outputs. A scoring function may maximize a probability that a given input and/or combination of elements inputs is associated with a given output to minimize a probability that a given input is not associated with a given output. A scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 6, machine learning processes may include unsupervised machine-learning processes 632. An "unsupervised machine-learning process" as used in this disclosure is a process that calculates relationships in one or more datasets without labelled training data. Unsupervised machine-learning process 632 may be free to discover any structure, relationship, and/or correlation provided in training data 604. Unsupervised machine-learning process 632 may not require a response variable. Unsupervised machine-learning process 632 may calculate patterns, inferences, correlations, and the like between two or more variables of training data 604. In some embodiments, unsupervised machine-learning process 632 may determine a degree of correlation between two or more elements of training data 604.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of I divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It should also be noted that the present implementations can be provided as one or more computer-readable programs embodied on or in one or more articles of manufacture. The article of manufacture can be any suitable hardware apparatus. In general, the computer-readable programs can be implemented in any programming language. The software programs can be further translated into machine language or virtual machine instructions and stored in a program file in that form. The program file can then be stored on or in one or more of the articles of manufacture.

Figure 7:
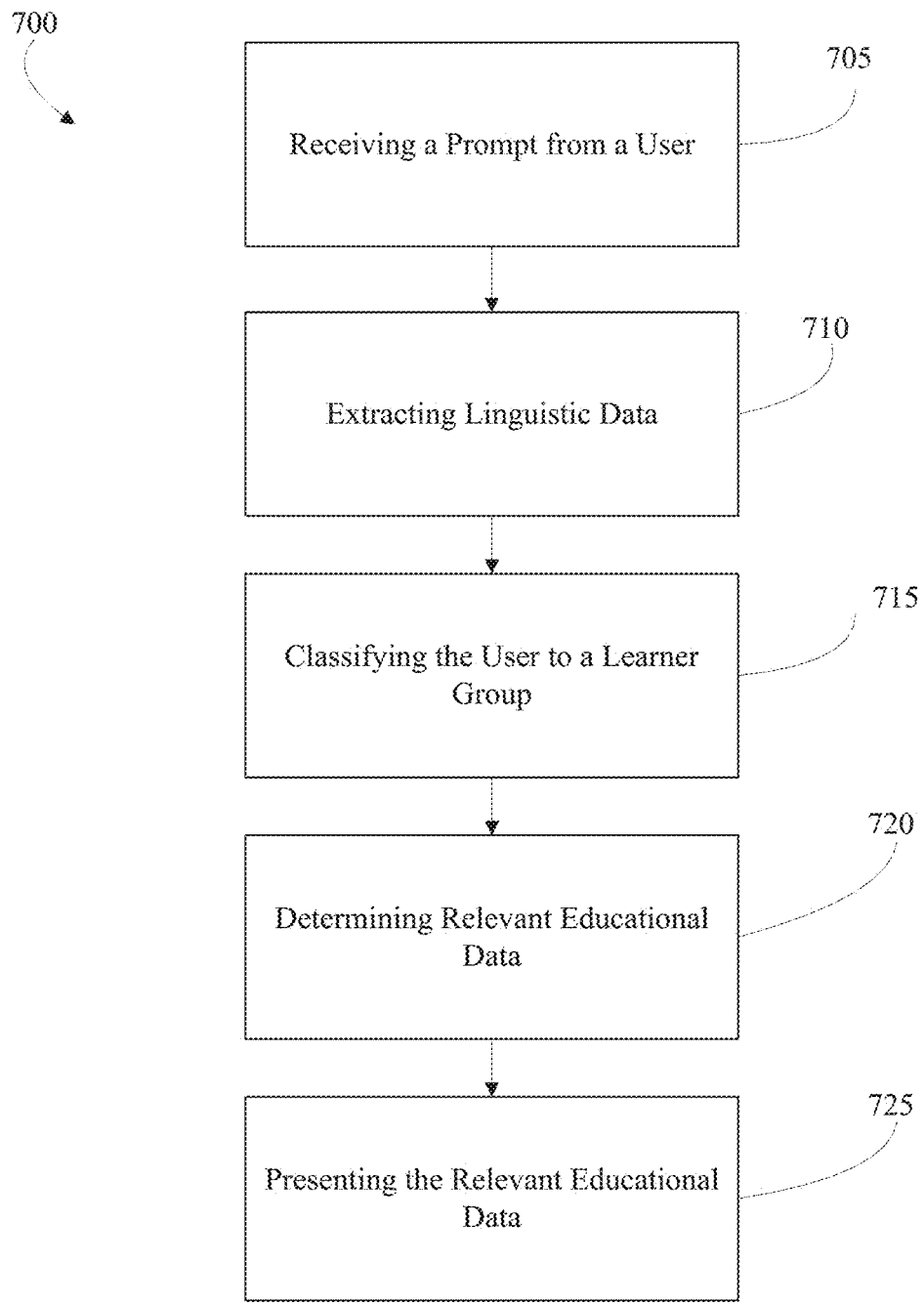
FIG. 7 illustrates an exemplary embodiment of a method of automated tutoring using an automated tutoring model.

Referring now to FIG. 7, a flowchart of a method 700 for automated tutoring using an automated tutoring model is presented. At step 705, a prompt is received from a user. A prompt may be received through user input such as, but not limited to, keyboard, mouse, touchscreen, and/or other input forms. A prompt may include an educational query, such as a question regarding a subject matter of study which includes, but is not limited to, math, science, history, English, and the like. In some embodiments, a prompt may include an instructions, such as an instruction to provide images, videos, textbook passages, and the like. A prompt may include conversational language, such as a sentence referring to a previous prompt. This step may be implemented, without limitation, as described above with reference to FIGS. 1-6.

At step 710, linguistic data is extracted. Linguistic data may include one or more characters, symbols, words, punctuation marks, and the like. Linguistic data may be extracted from a user prompt. In some embodiments, linguistic data may include one or more word vectors. This step may be implanted, without limitation, as described above with reference to FIGS. 1-6.

At step 715, method 700 includes classifying the user to a learner group. The user may be classified to a learner group based on, but not limited to, educational styles, learning progress, engagement, user input, prompts, and/or other data. In some embodiments, an automated tutoring model may include a learner group classifier. A learner group classifier may input user data, such as prompts or other user input, and classify the user to a learner group based on the data. Learner groups may include, but are not limited to, visual-learner groups, auditorial learner groups, slow learner groups, average learner groups, fast learner groups, and/or other groups. This step may be implanted, without limitation, as described above with reference to FIGS. 1-6

At step 720, relevant educational data is determined. Relevant educational data may include, but is not limited to, textbook passages, professor notes, whitepapers, journals, video transcripts, and/or other forms of data. Relevant educational data may be determined through a large language model or other machine learning model. In some embodiments, relevancy may be determined through one or more vector distances between one or more words, characters, phrases, and the like. Relevancy may be determined through a machine learning model, such as a classifier or other machine learning model. This step may be implanted, without limitation, as described above with reference to FIGS. 1-6.

At step 725, relevant educational data is presented. Relevant educational data may be presented through a display device. A display device may include, but is not limited to, a smartphone, laptop, monitor, tablet, and/or other device. Relevant educational data may be presented in a text, image, video, audio, and/or other form. This step may be implanted, without limitation, as described above with reference to FIGS. 1-6.

Figure 8:
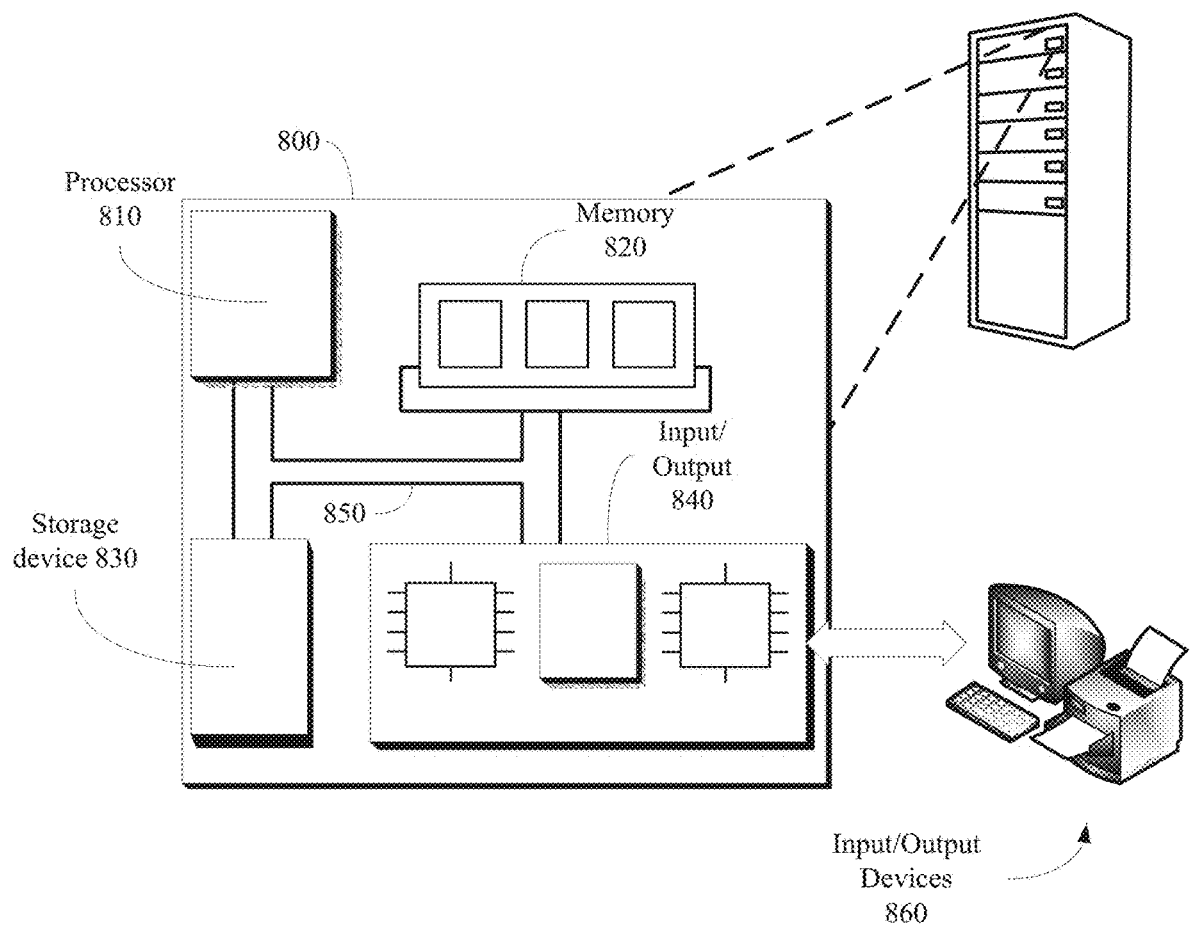
FIG. 8 illustrates an example computer system for implementing the systems and methods as described herein.

FIG. 8 is a block diagram of an example computer system 800 that may be used in implementing the technology described in this document. General-purpose computers, network appliances, mobile devices, or other electronic systems may also include at least portions of the system 800. The system 800 includes a processor 810, a memory 820, a storage device 830, and an input/output device 840. The apparatus may include disk storage and/or internal memory, each of which may be communicatively connected to each other. The apparatus 100 may include a processor 810. The processor 810 may enable both generic operating system (OS) functionality and/or application operations. In some embodiments, the processor 810 and the memory 820 may be communicatively connected. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. In some embodiments, the processor 810 may include any computing device as described in this disclosure, including without limitation a microcontroller, microprocessor, digital signal processor (DSP) and/or system on a chip (SoC) as described in this disclosure. The processor 810 may include, be included in, and/or communicate with a mobile device such as a mobile telephone or smartphone. The processor 810 may include a single computing device operating independently, or may include two or more computing device operating in concert, in parallel, sequentially or the like. Two or more computing devices may be included together in a single computing device or in two or more computing devices. The processor 810 may interface or communicate with one or more additional devices as described below in further detail via a network interface device. Network interface device may be utilized for connecting the processor 810 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. The processor 810 may include but is not limited to, for example, a computing device or cluster of computing devices in a first location and a second computing device or cluster of computing devices in a second location. The processor 810 may include one or more computing devices dedicated to data storage, security, distribution of traffic for load balancing, and the like. The processor 810 may distribute one or more computing tasks as described below across a plurality of computing devices of computing device, which may operate in parallel, in series, redundantly, or in any other manner used for distribution of tasks or memory between computing devices. The processor 104 may be implemented using a "shared nothing" architecture in which data is cached at the worker, in an embodiment, this may enable scalability of system 800 and/or processor 810.

With continued reference to FIG. 8, processor 810 and/or a computing device may be designed and/or configured by memory 820 to perform any method, method step, or sequence of method steps in any embodiment described in this disclosure, in any order and with any degree of repetition. For instance, the processor 810 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. The processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Each of the components 810, 820, 830, and 840 may be interconnected, for example, using a system bus 850. The processor 810 is capable of processing instructions for execution within the system 800. In some implementations, the processor 810 is a single-threaded processor. In some implementations, the processor 810 is a multi-threaded processor. In some implementations, the processor 810 is a programmable (or reprogrammable) general purpose microprocessor or microcontroller. The processor 810 is capable of processing instructions stored in the memory 820 or on the storage device 830.

The memory 820 stores information within the system 800. In some implementations, the memory 820 is a non-transitory computer-readable medium. In some implementations, the memory 820 is a volatile memory unit. In some implementations, the memory 820 is a non-volatile memory unit.

The storage device 830 is capable of providing mass storage for the system 800. In some implementations, the storage device 830 is a non-transitory computer-readable medium. In various different implementations, the storage device 830 may include, for example, a hard disk device, an optical disk device, a solid-date drive, a flash drive, or some other large capacity storage device. For example, the storage device may store long-term data (e.g., database data, file system data, etc.). The input/output device 840 provides input/output operations for the system 800. In some implementations, the input/output device 840 may include one or more network interface devices, e.g., an Ethernet card, a serial communication device, e.g., an RS-232 port, and/or a wireless interface device, e.g., an 802.11 card, a 3G wireless modem, or a 4G/5G wireless modem. In some implementations, the input/output device may include driver devices configured to receive input data and send output data to other input/output devices, e.g., keyboard, printer and display devices 860. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 830 may be implemented in a distributed way over a network, for example as a server farm or a set of widely distributed servers, or may be implemented in a single computing device.

Although an example processing system has been described in FIG. 8, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, a data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The terms "about" or "substantially" that modify a condition or relationship characteristic of a feature or features of an embodiment of the disclosure, are to be understood to mean that the condition or characteristic is defined to within tolerances that are acceptable for operation of the embodiment for an application for which it is intended. For example, the terms "about," "substantially," and/or "close" with respect to a magnitude or a numerical value may imply to be within an inclusive range of −10% to +10% of the respective magnitude or value.

It must be noted that, as used in the specification, the singular forms "a," "an" and "the" include plural referents unless the context clearly dictates otherwise. By way of example, "an analogue" means one analogue or more than one analogue.

Each numerical value presented herein is contemplated to represent a minimum value or a maximum value in a range for a corresponding parameter. Accordingly, when added to the claims, the numerical value provides express support for claiming the range, which may lie above or below the numerical value, in accordance with the teachings herein. Every value between the minimum value and the maximum value within each numerical range presented herein (including in the figures), is contemplated and expressly supported herein, subject to the number of significant digits expressed in each particular range. Absent express inclusion in the claims, each numerical value presented herein is not to be considered limiting in any regard.

Having described certain embodiments of the disclosure, it will be apparent to those of ordinary skill in the art that other embodiments incorporating the concepts disclosed herein may be used without departing from the spirit and scope of the disclosure. Accordingly, the described embodiments are to be considered in all respects as only illustrative and not restrictive. The terms and expressions employed herein are used as terms and expressions of description and not of limitation and there is no intention, in the use of such terms and expressions, of excluding any equivalents of the features shown and described or portions thereof. The structural features and functions of the various embodiments may be arranged in various combinations and permutations, and all are considered to be within the scope of the disclosure. Unless otherwise necessitated, recited steps in the various methods may be performed in any order and certain steps may be performed substantially simultaneously and/or in parallel.

The invention claimed is:

1. An apparatus for delivering adaptive educational content using an automated tutoring model, comprising:
    a processor; and
    a memory communicatively connected to the processor, the memory containing instructions configuring the processor to:
    receive a prompt from a user;
    extract linguistic data of the prompt through an automated tutoring model;
    determine, through the automated tutoring model, relevant educational data for the user based on the linguistic data of the prompt, wherein the automated tutoring model is in communication with an educational database;
    classify, through the automated tutoring model, the user to a learner group based on the prompt;
    select, through the automated tutoring model, the relevant educational data from the educational database based at least in part on the learner group; and
    present the relevant educational data to the user through a display device in communication with the processor.

2. The apparatus of claim 1, wherein the automated tutoring model is configured to:
    receive a second prompt from the user based on the relevant educational data presented to the user;
    calculate, based on the prompt, second prompt, and educational data, a response for the second prompt; and
    display the response for the second prompt to the user through the display device.

3. The apparatus of claim 1, wherein the educational database includes textbooks, professor notes, video transcripts, or a combination thereof.

4. The apparatus of claim 1, wherein the processor is further configured to retrieve educational data from one or more external databases through an application programming interface (API).

5. The apparatus of claim 4, wherein the processor is further configured to communicate the retrieved educational data to the automated tutoring model, wherein the automated tutoring model is configured to determine the relevant educational data based at least in part on the retrieved educational data.

6. The apparatus of claim 1, wherein educational database includes proprietary educational data.

7. The apparatus of claim 1, wherein the educational database includes a ratio of proprietary to non-propriety educational data.

8. The apparatus of claim 1, wherein the automated tutoring model is configured to determine an engagement of the user with the educational data and determine a response style based on the engagement of the user.

9. The apparatus of claim 8, wherein the automated tutoring model is configured to determine a format of the educational data based on the engagement of the user and present educational data in the determined format to the user.

10. The apparatus of claim 1, wherein the automated tutoring model is configured to track a progress of a user's learning through the prompt and determine educational data for the user based at least in part on the user's progress.

11. A method for delivering adaptive educational content using an automated tutoring model, comprising:
    receiving a prompt from a user at an automated tutoring model;
    extracting linguistic data of the prompt through the automated tutoring model;
    determining relevant educational data for the user based on the linguistic data of the prompt through the automated tutoring model, wherein the automated tutoring model is in communication with an educational database;
    classifying, through the automated tutoring model, the user to a learner group based on the prompt;
    selecting, through the automated tutoring model, the relevant educational data from the educational database based at least in part on the learner group; and
    presenting the relevant educational data to the user through a display device.

12. The method of claim 11, further comprising:
    receiving a second prompt at the automated tutoring model from the user based on the relevant educational data presented to the user;
    calculating, based on the prompt, second prompt, and educational data, a response for the second prompt through the automated tutoring model; and
    displaying the response for the second prompt to the user through the display device.

13. The method of claim 11, wherein the educational database includes textbooks, professor notes, video transcripts, or a combination thereof.

14. The method of claim 11, further comprising retrieving educational data from one or more external databases through an application programming interface (API).

15. The method of claim 14, further comprising communicating the retrieved educational data to the automated tutoring model, and determining, through the automated tutoring model, relevant educational data based at least in part on the retrieved educational data.

16. The method of claim 11, wherein the educational database includes proprietary educational data.

17. The method of claim 11, wherein the educational database includes a ratio of proprietary to non-propriety educational data.

18. The method of claim 11, further comprising determining an engagement of the user with the educational data and determine a response style based on the engagement of the user.

19. The method of claim 18, further comprising determining a format of the educational data based on the engagement of the user and presenting educational data in the determined format to the user.

20. The method of claim 11, further comprising tracking a progress of a user's learning through the prompt and determining educational data for the user based at least in part on the user's progress through the automated tutoring model.

\* \* \* \* \*